US009088914B2

(12) United States Patent
Yoshizawa et al.

(10) Patent No.: US 9,088,914 B2
(45) Date of Patent: Jul. 21, 2015

(54) WIRELESS TERMINAL, WIRELESS COMMUNICATION METHOD, AND WIRELESS COMMUNICATION SYSTEM

(75) Inventors: Atsushi Yoshizawa, Kanagawa (JP); Hiroaki Takano, Saitama (JP)

(73) Assignee: Sony Corporation, Tokyo (JP)

( * ) Notice: Subject to any disclaimer, the term of this patent is extended or adjusted under 35 U.S.C. 154(b) by 90 days.

(21) Appl. No.: 13/818,703

(22) PCT Filed: Aug. 18, 2011

(86) PCT No.: PCT/JP2011/068658
§ 371 (c)(1),
(2), (4) Date: Feb. 25, 2013

(87) PCT Pub. No.: WO2012/046512
PCT Pub. Date: Apr. 12, 2012

(65) Prior Publication Data
US 2013/0155864 A1    Jun. 20, 2013

(30) Foreign Application Priority Data

Oct. 7, 2010  (JP) ................................ 2010-227869

(51) Int. Cl.
| H04L 12/26 | (2006.01) |
| H04J 3/08 | (2006.01) |
| G01R 21/00 | (2006.01) |
| H04W 4/00 | (2009.01) |
| H04W 28/12 | (2009.01) |
| H04W 4/08 | (2009.01) |
| H04W 8/24 | (2009.01) |
| H04W 8/22 | (2009.01) |
| H04W 28/04 | (2009.01) |
| H04W 74/08 | (2009.01) |

(52) U.S. Cl.
CPC .............. *H04W 28/12* (2013.01); *H04W 4/005* (2013.01); *H04W 4/08* (2013.01); *H04W 8/24* (2013.01); *H04W 8/22* (2013.01); *H04W 28/04* (2013.01); *H04W 74/0833* (2013.01)

(58) Field of Classification Search
USPC .............. 370/235, 252, 328; 702/61; 455/434
See application file for complete search history.

(56) References Cited

U.S. PATENT DOCUMENTS

| 2001/0023185 | A1* | 9/2001 | Hakkinen et al. ............. 455/434 |
| 2007/0291661 | A1* | 12/2007 | Nishibayashi et al. ....... 370/252 |
| 2008/0172191 | A1* | 7/2008 | Kim et al. ........................ 702/61 |
| 2010/0172299 | A1* | 7/2010 | Fischer et al. ................ 370/328 |
| 2011/0128911 | A1* | 6/2011 | Shaheen ....................... 370/328 |

FOREIGN PATENT DOCUMENTS

| CN | 101365220 A | 2/2009 |
| JP | 11-196041 A | 7/1999 |

(Continued)

OTHER PUBLICATIONS

U.S. Appl. No. 13/819,346, filed Feb. 27, 2013, Yoshizawa, et al.
Sierra Wireless, "Broadcasting of MTC Access Barring", 3GPP TSG SA WG2 Meeting# 79E, S2-103114, Jul. 13, 2011.

(Continued)

Primary Examiner — Kiet G Tang
(74) Attorney, Agent, or Firm — Sony Corporation

(57) ABSTRACT

There is provided a wireless terminal including a storage section that stores information on a plurality of wireless terminals forming a group in which the wireless terminal operates as a representative wireless terminal, a communication control section that controls random access to a base station before another wireless terminal in the group, and a transmitting section that transmits the information on the plurality of wireless terminals stored in the storage section to the base station.

13 Claims, 12 Drawing Sheets

(56) References Cited

FOREIGN PATENT DOCUMENTS

| | | |
|---|---|---|
| JP | 2008-60852 A | 3/2008 |
| WO | WO 2009/133599 A1 | 11/2009 |

OTHER PUBLICATIONS

Chinese Office Action issued on Apr. 3, 2015 in patent application No. 201180047491.X.

\* cited by examiner

FIG. 11

| RACH configuration index | SUBFRAME NUMBER |
|---|---|
| 0 | 1 |
| 1 | 4 |
| 2 | 7 |
| 3 | 1 |
| 4 | 4 |
| 5 | 7 |
| 6 | 1, 6 |
| 7 | 2, 7 |
| 8 | 3, 8 |
| 9 | 1, 4, 7 |
| 10 | 2, 5, 8 |
| 11 | 3, 6, 9 |
| 12 | 0, 2, 4, 6, 8 |
| 13 | 1, 3, 5, 7, 9 |
| 14 | 0, 1, 2, 3, 4, 5, 6, 7, 8, 9 |
| 15 | 9 |
| ⋮ | ⋮ |

WIRELESS TERMINAL, WIRELESS COMMUNICATION METHOD, AND WIRELESS COMMUNICATION SYSTEM

TECHNICAL FIELD

The present invention relates to a wireless terminal, a wireless communication method, and a wireless communication system.

BACKGROUND ART

Currently, standardization of a 4G wireless communication system is ongoing in 3GPP (Third Generation Partnership Project). Using a technique such as relay, carrier aggregation, or the like according to 4G, it is possible to realize an increase in maximum communication speed or improvement in quality at a cell edge. Also, examination is being carried out on improvement in coverage by introducing a base station, such as an HeNodeB (Home eNodeB), a femto-cell base station, a small base station for cellular phones), an RHH (Remote Radio Head), or the like, other than an eNodeB (macro-cell base station).

In such a wireless communication system, UE (User Equipment: user terminal) synchronizes frames with a base station based on a synchronization signal transmitted from the base station, and then synchronizes an oscillator in the UE with an oscillator of the base station with high accuracy. Each piece of UE performs time adjustment in accordance with the distance between the base station and the piece of UE, which is referred to as Timing Advance, so that wireless signals transmitted from a plurality of user terminals can be received by the base station at the same time. Specifically, Timing Advance is performed during a random access procedure in which a user terminal transmits a preamble for a random access window. From a relationship between a time when the preamble arrives at the base station and the random access window, it is possible to acquire a Timing Advance value. Such random access is disclosed in Patent Literature 1, Patent Literature 2, and the like.

Meanwhile, MTC (Machine Type Communications) has also been under discussion in 3GPP. In general, MTC has the same meaning as M2M (Machine to Machine), and denotes communication that is not directly used by humans between a machine and another machine. This MTC is mainly performed between a server and an MTC terminal that is not directly used by humans.

For example, in a medical MTC application, an MTC terminal may collect electrocardiogram information on a human and transmit the electrocardiogram information to a server using an uplink when a trigger condition is satisfied. Also in another MTC application, a vending machine may be caused to function as an MTC terminal, and a server may be caused to report sales of the vending machine under management at predetermined periods (for example, 30 days).

CITATION LIST

Patent Literature

Patent Literature 1: JP 2008-60852A
Patent Literature 2: WO 2009/133599

SUMMARY OF INVENTION

Technical Problem

However, when the MTC terminals proliferate, MTC congestion may be caused by the concentration of random access by the MTC terminals.

Thus, the present invention has been made in consideration of the problem mentioned above, and is directed to provide a new and improved wireless terminal, wireless communication method, and wireless communication system capable of appropriately avoiding congestion caused by the concentration of random access.

Solution to Problem

The present technology is provided to solve the above-mentioned issues. According to an embodiment of the present technology, there is provided a wireless terminal including a storage section that stores information on a plurality of wireless terminals forming a group in which the wireless terminal operates as a representative wireless terminal, a communication control section that controls random access to a base station before another wireless terminal in the group, and a transmitting section that transmits the information on the plurality of wireless terminals stored in the storage section to the base station.

Control information for controlling random access by the plurality of wireless terminals may be set based on the information on the plurality of wireless terminals transmitted from the transmitting section.

The information on the plurality of wireless terminals may include number-of-terminals-information indicating a number of the plurality of wireless terminals.

The wireless terminal may further include a receiving section that receives the information on the plurality of wireless terminals from a server managing the plurality of wireless terminals.

The transmitting section may transmit the information on the plurality of wireless terminals to the base station in a process of the random access.

The transmitting section may transmit the information on the plurality of wireless terminals to the base station after the random access.

The group may be classified according to an access class set in USIMs of the plurality of wireless terminals.

The plurality of wireless terminals forming the group may be present in a cell area of the base station.

Further, according to another embodiment of the present technology, there is provided a wireless communication method performed in a wireless terminal, the method including storing information on a plurality of wireless terminals forming a group in which the wireless terminal operates as a representative wireless terminal, controlling random access to a base station before another wireless terminal in the group, and transmitting the information on the plurality of wireless terminals to the base station.

Further, according to another embodiment of the present technology, there is provided a wireless communication system including a base station, and a wireless terminal that operates as a representative wireless terminal of a plurality of wireless terminals forming a group. The wireless terminal may include a storage section that stores information on the plurality of wireless terminals, a communication control section that controls random access to the base station before another wireless terminal in the group, and a transmitting section that transmits the information on the plurality of wireless terminals stored in the storage section to the base station.

Advantageous Effects of Invention

According to the present invention, it is possible to appropriately avoid congestion caused by the concentration of random access as described above.

BRIEF DESCRIPTION OF DRAWINGS

FIG. 11 is an explanatory diagram showing a relationship between a RACH_configuration_index and a subframe.

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference signs, and repeated explanation is omitted.

In this specification and the drawings, a plurality of elements having substantially the same function and structure may be distinguished by attaching different letters to the end of the same reference sign. For example, a plurality of elements having substantially the same function and structure are distinguished as MTC terminals 20A, 20B and 20C according to necessity. However, when there is no particular necessity to distinguish a plurality of elements having substantially the same function and structure, only the same reference sign is given. For example, when there is no particular necessity to distinguish MTC terminals 20A, 20B and 20C, the MTC terminals are simply designated as MTC terminals 20.

"Description of Embodiments" will be described according to the order of items shown below.

1. Outline of Wireless Communication System
1-1. Configuration of Wireless Communication System
1-2. Frame Synchronization
1-3. Random Access
1-4. ACB
2. First Embodiment
2-1. Grouping of MTC Terminals
2-2. Configuration of Base Station
2-3. Configuration of MTC Terminal
2-4. Operation of Wireless Communication System
3. Second Embodiment
4. Summarization <1. Outline of Wireless Communication System>

Currently, standardization of a 4G wireless communication system is ongoing in 3GPP. Embodiments of the present invention can be applied to the 4G wireless communication system by way of example, and thus the outline of the 4G wireless communication system will be described first.

[1-1. Configuration of Wireless Communication System]

Figure 1:
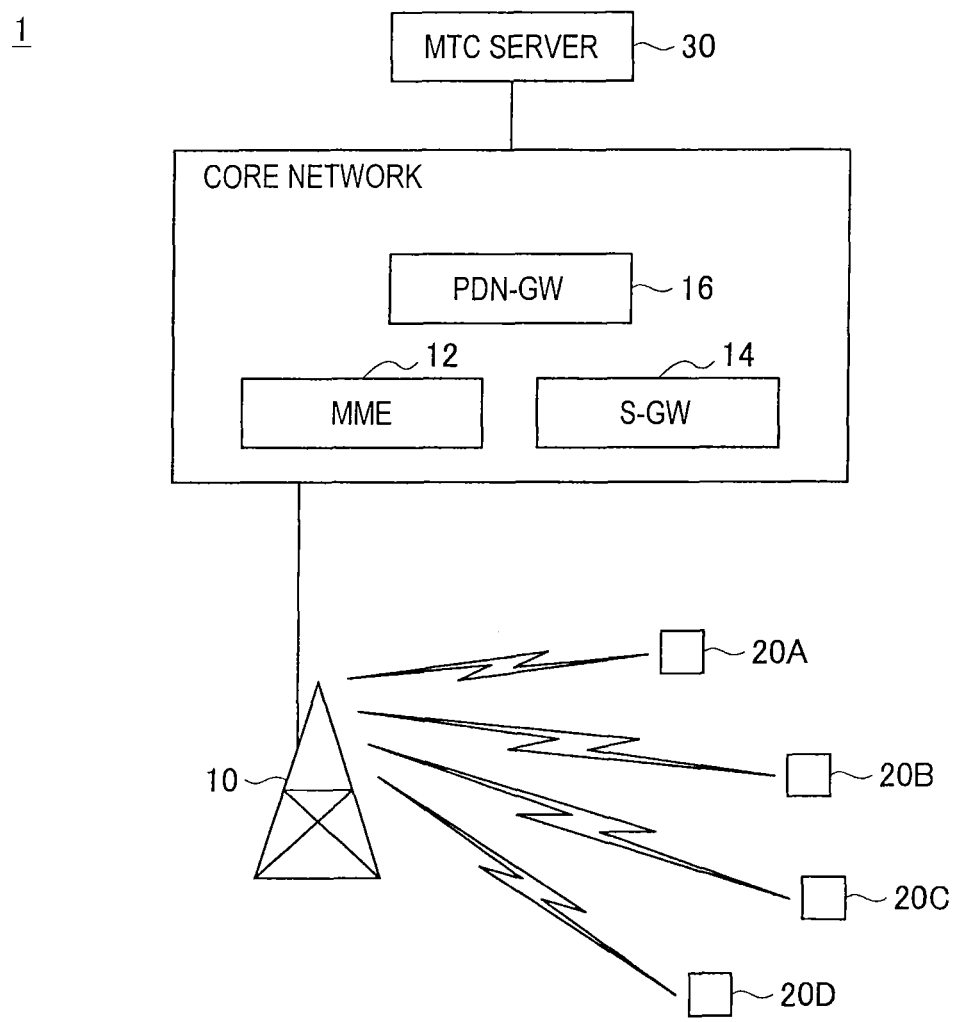
FIG. 1 is an explanatory diagram showing a configuration example of a wireless communication system.

FIG. 1 is an explanatory diagram showing a configuration example of a wireless communication system 1. As shown in FIG. 1, the wireless communication system 1 includes a base station 10, a core network including an MME (Mobility Management Entity) 12, an S-GW (Serving Gateway) 14 and a PDN (Packet Data Network)-GW 16, MTC terminals 20, and an MTC server 30.

Embodiments of the present invention can be applied to wireless communication devices such as the base station 10, the MTC terminals 20, and the like shown in FIG. 1. Here, the base station 10 may be, for example, an eNodeB, a relay node, or a Home eNodeB that is a small home base station. Also, an MTC terminal 20 is one example of a user terminal (UE: User Equipment), and embodiments of the present invention can be also applied to a non-MTC terminal such as a cellular phone, a PC (Personal Computer), or the like.

The base station 10 is a wireless base station that communicates with the MTC terminals 20. In FIG. 1, only the one base station 10 is shown, but a plurality of base stations 10 are actually connected to the core network. Although not shown in FIG. 1, the base station 10 also communicates with other user terminals such as non-MTC terminals and the like.

The MME 12 is a device that establishes or opens a session for data communication or controls handover. This MME 12 is connected with the base station 10 through an interface referred to as X2.

The S-GW 14 is a device that performs routing, transmission and the like of user data. The PDN-GW 16 functions as an access point with an IP service network to transmit user data to the IP service network.

The MTC terminals 20 are wireless terminals specialized in MTC that is under discussion in 3GPP and is communication not directly used by humans between a machine and another machine. These MTC terminals 20 perform wireless communication with the base station 10 in accordance with an application. Also, the MTC terminals 20 perform bidirectional communication with the MTC server 30 via the core network.

For example, in a medical MTC application, an MTC terminal 20 may collect electrocardiogram information on a human and transmit the electrocardiogram information to a server using an uplink when a trigger condition is satisfied. In another MTC application, a vending machine may be caused to function as an MTC terminal 20, and the MTC server 30 may be caused to report sales of the vending machine under management at predetermined periods (for example, 30 days). FIG. 1 shows an example in which the MTC server 30 is installed in the wireless communication system 1 as an independent device, but this embodiment is not limited to such an example. For example, functions of the MTC server 30 may be implemented in the base station 10, such as an eNodeB or a relay node, the MTC terminals 20, or non-MTC terminals. In other words, the base station 10, such as an eNodeB or a relay node, the MTC terminals 20, or non-MTC terminals may also perform functions of the MTC server 30.

Although such MTC terminals 20 generally have the following features by way of example, each of the MTC terminals 20 do not necessarily have all the following features, but has features dependent on an application.

Almost no movement (Low Mobility)

Transmission of a small amount of data (Online Small Data Transmission)

Extremely low consumption of power (Extra Low Power Consumption)

Handling each MTC by grouping the MTC (Group based MTC Features)

[1-2. Frame Synchronization]

The base station 10 and the MTC terminals 20 are not determined in detail, but are expected to perform wireless communication in a form in accordance with communication between the base station 10 and UE. Thus, a radio frame shared between the base station 10 and UE, and frame synchronization will be described below. Content to be described below can be used for communication between the base station 10 and the MTC terminals 20.

Figure 2:
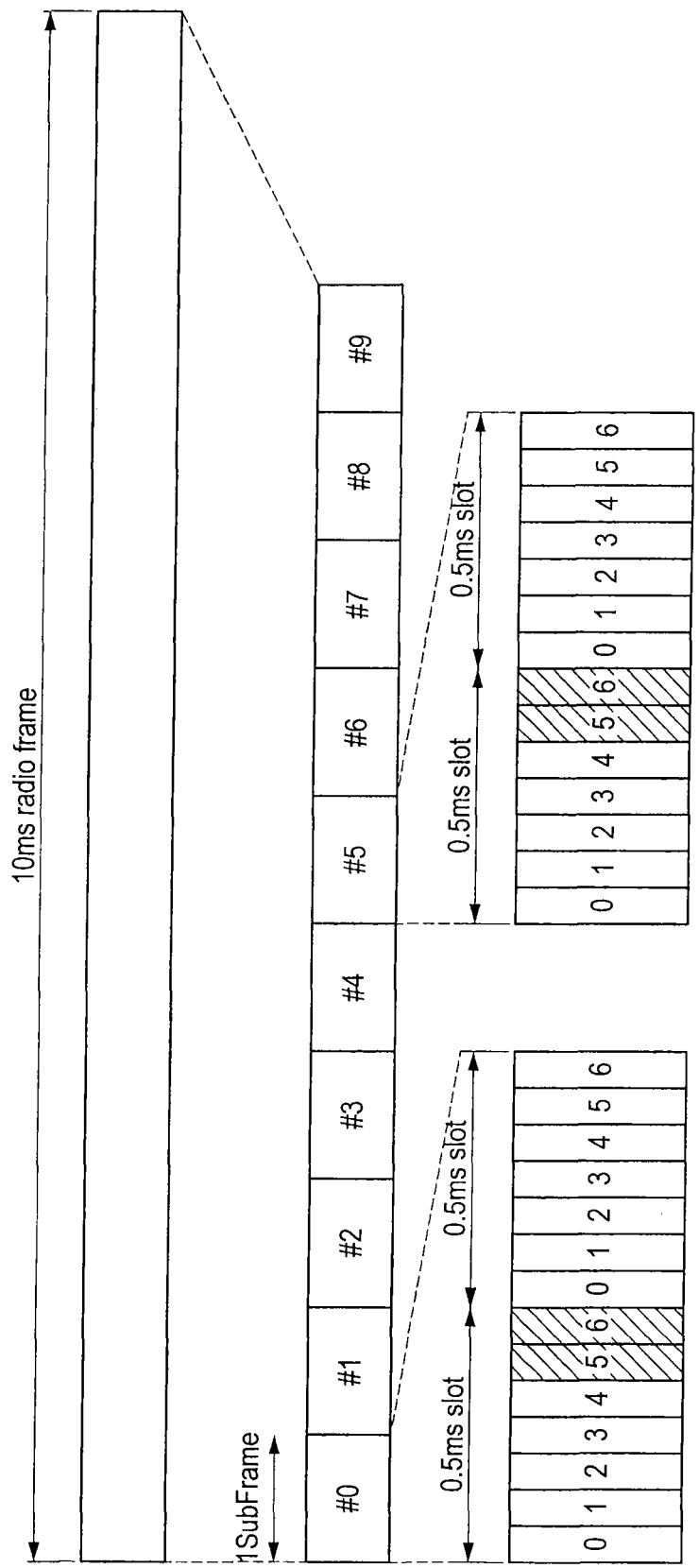
FIG. 2 is an explanatory diagram showing a frame format of 4G.

FIG. 2 is an explanatory diagram showing a frame format of 4G. As shown in FIG. 2, a radio frame of 10 ms consists of ten subframes #0 to #9 of 1 ms. Each subframe of 1 ms consists of two 0.5 ms slots. Each 0.5 ms slot consists of seven Ofdm symbols.

Using Ofdm symbols of FIG. 2 in which diagonal lines are drawn, a synchronization signal that is used for frame synchronization by UE is transmitted. More specifically, a Secondary Synchronization Signal (SSS) is transmitted in a fifth Ofdm symbol of subframe #0, a Primary Synchronization Signal (PSS) is transmitted in a sixth Ofdm symbol of subframe #0, a secondary synchronization signal is transmitted in a fifth Ofdm symbol of subframe #5, and a primary synchronization signal is transmitted in a sixth Ofdm symbol of subframe #5.

UE acquires a period of 5 ms using a primary synchronization signal, and simultaneously detects a cell number group corresponding to a current location from cell number groups that have been divided into three. After that, the UE acquires a radio frame period (period of 10 ms) using a secondary synchronization signal.

For a code sequence of a synchronization signal, a Zadoff-Chu sequence is used. Since 168 kinds of encoding sequences are used for cell numbers in a cell number group, and two kinds of encoding sequences are used to obtain a radio frame period, 336 kinds of encoding sequences are prepared. Based on a combination of a secondary synchronization signal transmitted in subframe #0 and a secondary synchronization signal transmitted in subframe #5, a user terminal can determine whether a received subframe is subframe #0 or subframe #5.

[1-3. Random Access]

Figure 3:
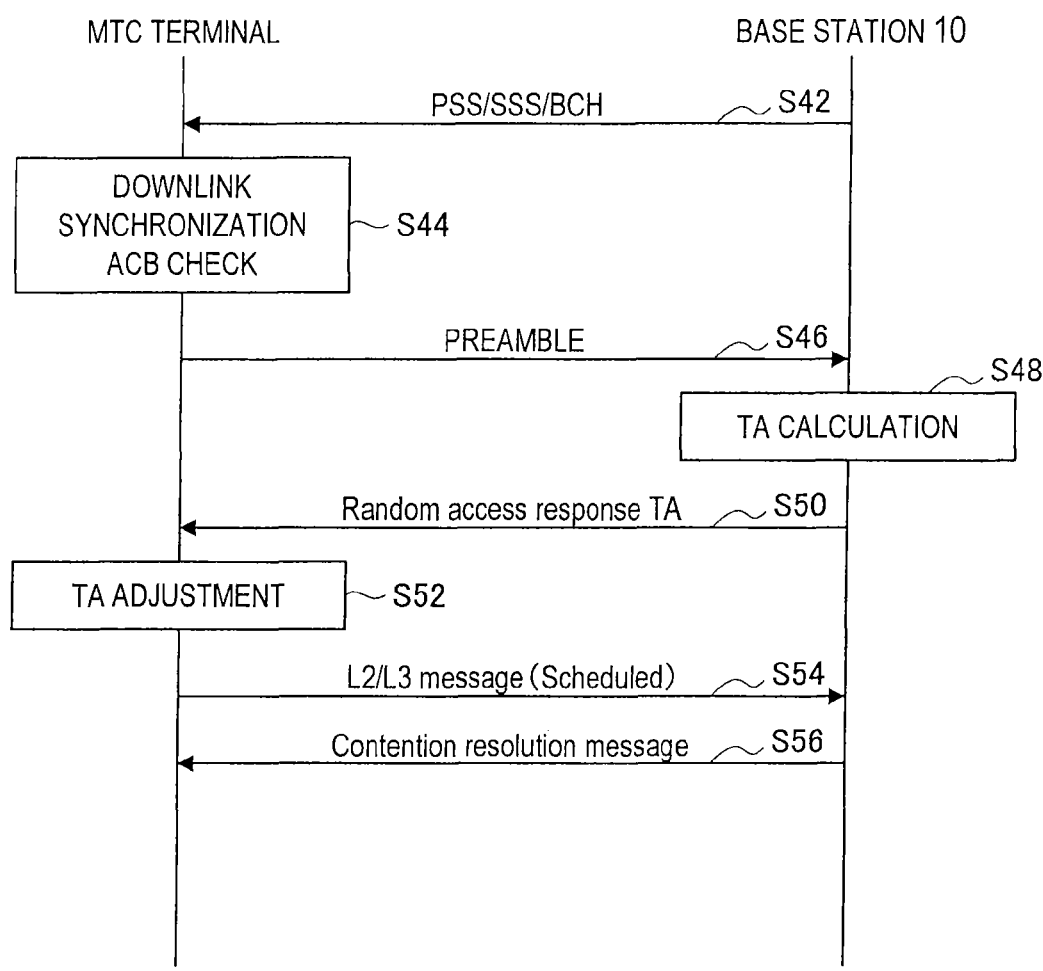
FIG. 3 is a sequence diagram illustrating random access.

4G UE is connected with the base station 10 by performing a procedure referred to as random access with the base station 10. Details are not determined, but general MTC terminals are considered as being connected with the base station 10 by performing the same random access as UE. With reference to FIG. 3, description will be made below regarding the flow of random access that is assumed to be performed by the base station 10 and a general MTC terminal.

FIG. 3 is a sequence diagram illustrating random access. As illustrated in FIG. 3, when a primary synchronization signal, a secondary synchronization signal and a BCH are received from the base station 10 (S42), an MTC terminal performs downlink frame synchronization as described in "1-2. Frame Synchronization," and also checks an ACB parameter included in the BCH (S44). ACB parameters will be described in detail in "1-4. ACB."

After that, the MTC terminal transmits a preamble for a random access window in a radio frame (S46). Here, the MTC terminal sets a PREAMBLE_TRANSMISSION_CO- NUNTER indicating a transmission number of a preamble to 1 and a backoff parameter value that is a parameter relating to backoff to 0, and transmits a preamble with appropriate power. When transmission of the preamble fails, the MTC terminal retransmits the preamble with reference to these parameters after a predetermined backoff time elapses. The MTC terminal transmits a preamble having a pattern selected from among a plurality of preamble patterns included in the BCH received from the base station 10.

The base station 10 calculates a Timing Advance value from a relationship between a time when the preamble arrives at the base station 10 and the random access window (S48). Then, the base station 10 transmits a random access response to the MTC terminal (S50). This random access response includes, for example, uplink transmission permitting data and the Timing Advance value.

When the random access response is received, the MTC terminal adjusts a transmission timing based on the Timing Advance value (S52), and then transmits an L2/L3 message (S54). In response to the L2/L3 message, the base station 10 transmits a contention resolution message to the MTC terminal (S56), so that the MTC terminal and the base station 10 are connected.

[1-4. ACB]

ACB is an access restriction in accordance with an AC (Access Class) in LTE. An AC is a number written in a USIM in advance, and has been allocated any one of 10 kinds of numbers from 0 to 9. According to a terminal, any one of numbers having higher priorities from 11 to 15 is allocated. For example, an AC of 13 corresponds to public utilities (water/gas), and a terminal belonging to this AC can have access with a higher priority.

ACB parameters are parameters, such as an AC barring factor, an AC barring time, and the like, announced as system information by the base station 10 to implement ACB described above.

An AC barring factor is threshold information compared with a random number generated in an MTC terminal so as to determine whether transmission by the MTC terminal is possible. In other words, the MTC terminal generates a random number from 0 to 1, such as 0.163, 0.2 and 0.89, and compares the generated random number with the AC barring factor. When the random number is smaller than the AC barring factor, transmission by the MTC terminal is permitted.

Meanwhile, an AC barring time is time information for, when transmission by an MTC terminal is not permitted according to a comparison between a random number generated by the MTC terminal and an AC barring factor, determining a timing for the MTC terminal to perform the corresponding process again. The MTC terminal performs random access again after a time determined based on this AC barring time received from the base station 10 elapses.

Devising of Embodiments of Present Invention

However, when the MTC terminals proliferate, MTC congestion may be caused by the concentration of random access by the MTC terminals. More specifically, MTC congestion may mainly occur in two cases to be described below.

(First Case)

An MTC terminal may be required to be connected with the base station 10 periodically such as every 30 minutes, with each time signal, or the like, and transmit information to an MTC server via the base station 10. In this case, a large number of MTC terminals are expected to perform random access including transmission of preambles at the same time upon connection with the base station 10. As a result, the concentration of random access may occur, and MTC congestion may be caused.

(Second Case)

Due to power restoration immediately after a blackout, a disaster, heavy rain, and the like, telemetric MTC terminals may perform unexpected sudden/irregular transmission at the same time. Also in this case, the concentration of random access may occur, and MTC congestion may be caused.

Between these two cases, congestion in the first case can be predicted in advance, so that the number of accesses from MTC terminals can be appropriately adjusted by, for example, ACB described above. Also, the base station 10 acquires statistics on an increase or decrease in periodic access in advance, calculates an estimated amount of access to appropriately distribute radio resources, and thereby can take appropriate measures for the concentration of access to some degree.

However, since congestion in the second case is caused by simultaneous sudden/irregular transmission, it is difficult to predict the congestion and for an MTC terminal to perform access control by ACB in advance. When MTC terminals can be notified of ACB parameters as system information very frequently or instantaneously in preparation for simultaneous sudden/irregular transmission, it is possible to avoid the congestion. However, it is assumed that there are many cases in which MTC terminals are not always connected to RAN in terms of power consumption reduction, and a huge amount of radio resources is consumed for notification of system information.

Thus, embodiments of the present invention have been devised in view of the circumstances. According to embodiments of the present invention, it is possible to appropriately avoid congestion caused by the concentration of random access. Such embodiments of the present invention will be described in detail below.

2. First Embodiment

[2-1. Grouping of MTC Terminals]

Each embodiment of the present invention is implemented by grouping a plurality of MTC terminals 20 and determining representative MTC terminals in groups. Thus, prior to description of a configuration of the base station 10 or the MTC terminals 20, grouping of the MTC terminals 20 or determination of a representative MTC terminal will be described.

Figure 4:
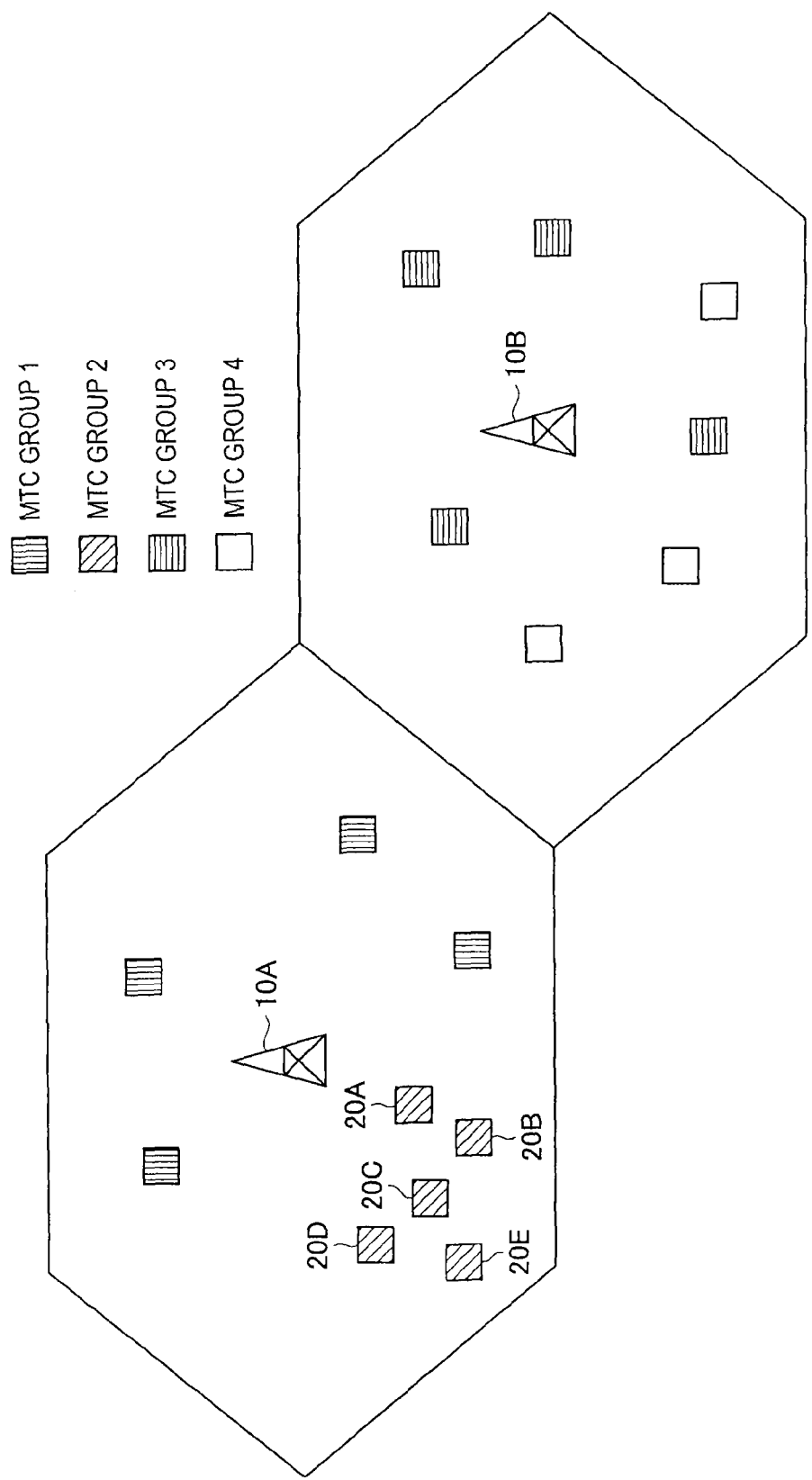
FIG. 4 is an explanatory diagram showing a detailed example of grouping of MTC terminals.

FIG. 4 is an explanatory diagram showing a detailed example of grouping of MTC terminals 20. As shown in FIG. 4, MTC terminals 20 located in a cell area of the same base station 10 are classified into a plurality of groups. For example, MTC terminals 20 located in a cell area of a base station 10A are classified into MTC group 1 and MTC group 2 as shown in FIG. 4.

Among a plurality of MTC terminals 20 belonging to each MTC group, one or two or more MTC terminals 20 are determined as representative MTC terminals. For example, in MTC group 2 consisting of MTC terminals 20A to 20E, the MTC terminal 20A is determined as a representative MTC terminal. An example of such a grouping method and method of determining a representative MTC terminal will be described below.

Figure 5:
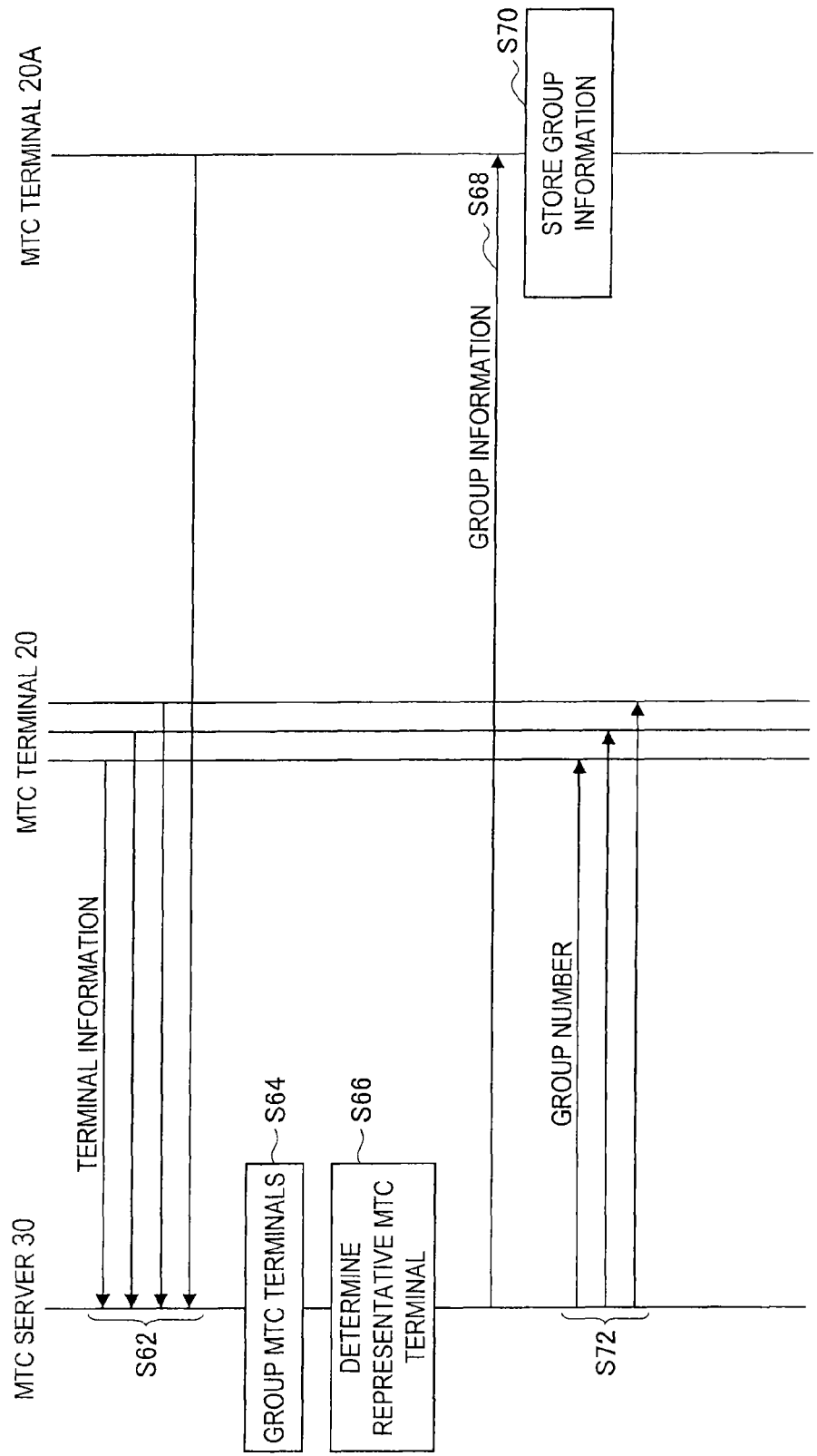
FIG. 5 is an explanatory diagram illustrating a sequence relating to grouping of MTC terminals.

FIG. 5 is an explanatory diagram illustrating a sequence relating to grouping of MTC terminals 20. As illustrated in FIG. 5, each MTC terminal 20 transmits terminal information to the MTC server 30 (S62). Here, the terminal information includes information for specifying a base station 10 having a cell area in which the MTC terminal 20 is located. For example, terminal information may be location information acquired through the GPS, various sensors, or the like, signal intensity information on each base station 10 with respect to the MTC terminal 20, a base station ID of a base station 10 to which the MTC terminal 20 has been connected before, an AC written in a USIM of the MTC terminal 20, and the like.

When terminal information is received from respective MTC terminals 20, the MTC server 30 groups the plurality of MTC terminals 20 based on the terminal information (S64). Specifically, the MTC server 30 groups MTC terminals 20 located in a cell area of each base station 10. Here, the MTC server 30 may put MTC terminals 20 having the same AC or MTC terminals 20 providing the same service into the same MTC group.

Subsequently, the MTC server 30 determines one or two or more MTC terminals 20 in each MTC group as representative MTC terminals of the MTC group (S66). The MTC server 30 may randomly determine the representative MTC terminals, or determine the representative MTC terminals to be distributed based on.

After that, the MTC server 30 transmits group information to MTC terminals determined as representative MTC terminals of each MTC group (S68). For example, when the MTC terminal 20A is determined as a representative MTC terminal of MTC group 2, the MTC server 30 transmits group information to the MTC terminal 20A. Then, the MTC terminal 20A stores the group information (S70). Here, group information includes number-of-terminals-information indicating the number of MTC terminals 20 belonging to an MTC group by way of example.

The MTC server 30 notifies each MTC terminal 20 of a group number representing an MTC group to which the MTC terminal 20 belongs (S72).

A method of grouping MTC terminals 20 and a method of determining a representative MTC terminal have been described above, but this embodiment is not limited to such an example. For example, information indicating an MTC group to which each MTC terminal 20 belongs or whether the MTC terminal 20 is a representative MTC terminal may be set in advance in the MTC terminal 20. Alternatively, a group to which an MTC terminal 20 belongs or a representative MTC terminal may be set by a person.

[2-2. Configuration of Base Station]

Next, a configuration of the base station 10 in accordance with the first embodiment of the present invention will be described with reference to FIG. 6.

Figure 6:
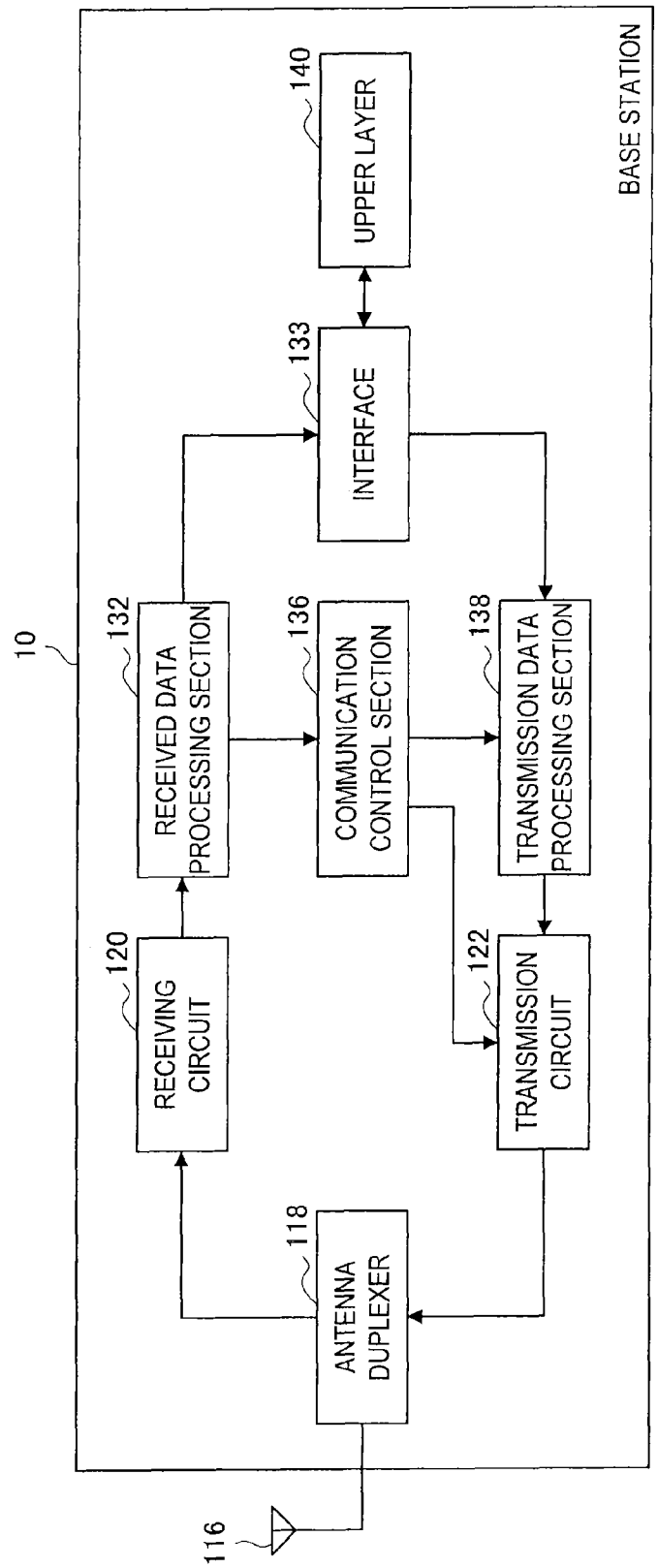
FIG. 6 is an explanatory diagram showing a configuration of a base station in accordance with a first embodiment.

FIG. 6 is an explanatory diagram showing a configuration of the base station 10 in accordance with the first embodiment. As shown in FIG. 6, the base station 10 includes an antenna 116, an antenna duplexer 118, a receiving circuit 120, a transmission circuit 122, a received data processing section 132, an interface 133, a communication control section 136, a transmission data processing section 138, and an upper layer 140.

The antenna 116 receives a wireless signal from an MTC terminal 20, and converts the wireless signal into an electrical reception signal. Upon reception, the antenna 116 and the receiving circuit 120 are connected through the antenna duplexer 118, and the reception signal obtained by the antenna 116 is supplied to the receiving circuit 120.

Upon transmission, the antenna 116 and the transmission circuit 122 are connected through the antenna duplexer 118, and a transmission signal is supplied from the transmission circuit 122 to the antenna 116. The antenna 116 transmits the transmission signal to an MTC terminal 20 as a wireless signal.

In FIG. 6, only one antenna is shown for convenience of description, but the base station 10 may have a plurality of antennas. When the base station 10 has a plurality of antennas, it is possible to perform MIMO (Multiple Input Multiple Output) communication, diversity communication, or the like.

The receiving circuit 120 performs demodulation processing, decoding processing, and the like of the reception signal supplied from the antenna 116, and supplies the post-process received data to the received data processing section 132. In this way, the receiving circuit 120 functions as a receiving section in cooperation with the antenna 116.

The transmission circuit 122 performs modulation processing and the like of a control signal (PDCCH, BCH, and the like) supplied from the communication control section 136 and a data signal (PDSCH) supplied from the transmission data processing section 138, and supplies a post-process transmission signal to the antenna 116. In this way, the transmission circuit 122 functions as a transmission section in cooperation with the antenna 116.

The received data processing section 132 analyzes the received data supplied from the receiving circuit 120, and supplies received data for the upper layer 140 to the interface 133. Meanwhile, the received data processing section 132 supplies group information from a representative MTC terminal 20 to the communication control section 136.

The interface 133 is an interface with the upper layer 140. The received data is output from the interface 133 to the upper layer 140, and the transmission data is input from the upper layer 140 to the interface 133.

The transmission data processing section 138 generates a data signal based on data supplied from the interface 133, and supplies the data signal to the transmission circuit 122.

The communication control section 136 controls overall communication such as resource allocation to respective MTC terminals 20, random access with an MTC terminal 20, or the like. Also, the communication control section 136 functions as a control information setting section that resets an ACB parameter for each MTC group, which is announced as system information in a BCH, based on the group information from the representative MTC terminal 20.

Specifically, in this embodiment, the representative MTC terminal 20 in an MTC group performs random access to the base station 10 prior to MTC terminals 20 in the MTC group, and notifies the base station 10 of number-of-terminals-information indicating the number of the MTC terminals 20 belonging to the MTC group as group information. In this way, the base station 10 can find the number of MTC terminals 20 waiting for random access, and resets the ACB parameter according to the number of MTC terminals 20 waiting for random access so that no concentration of random access occurs.

For example, the communication control section 136 may reset an AC barring factor to a smaller value as the number of terminals indicated by the number-of-terminals-information received from the representative MTC terminal 20 increases. As a detailed example, when an MTC terminal 20 generates a random number from 0 to 1 according to uniform distribution, and an AC barring factor is reset from 0.5 to 0.2, a probability that the random number generated by the MTC terminal 20 will be smaller than the AC barring factor is reduced from 50% to 20%. In this way, by resetting an AC barring factor to a small value, the probability that the random number generated by the MTC terminal 20 will be smaller than the AC barring factor is reduced, and thus it is possible to prevent the concentration of random access by MTC terminals 20.

Alternatively, the communication control section 136 may reset an AC barring time so that a timing of performing random access determined by the AC barring time is delayed more as the number of terminals indicated by the number-of-terminals-information received from the representative MTC terminal 20 increases. According to such a configuration, timings at which the MTC terminals 20 perform random access can be distributed, and it is possible to suppress congestion of random access.

Figure 7:
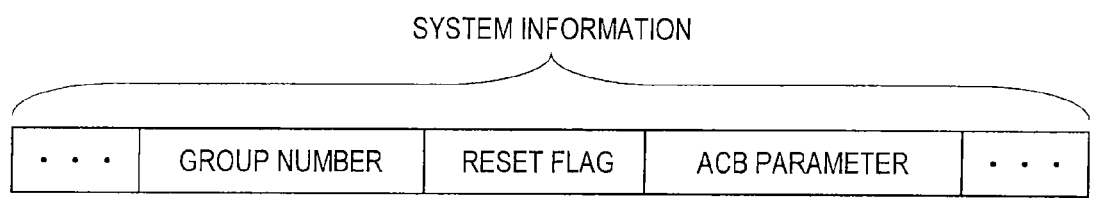
FIG. 7 is an explanatory diagram showing a configuration example of system information.

When the ACB parameter is reset as described above, the communication control section 136 writes a group number indicating an MTC group of a target and the post-reset ACB parameter in system information as shown in FIG. 7. In addition, the communication control section 136 adds a reset flag indicating whether the ACB parameter is a parameter obtained through reset based on the number-of-terminals-information. By checking the reset flag, the MTC terminals 20 can find whether the representative MTC terminal 20 has performed random access, and thus it becomes possible to perform random access after the representative MTC terminal 20.

[2-3. Configuration of MTC Terminal]

The configuration of the base station 10 in accordance with the first embodiment of the present invention has been described above. Next, a configuration of an MTC terminal 20 in accordance with the first embodiment of the present invention will be described with reference to FIG. 8.

Figure 8:
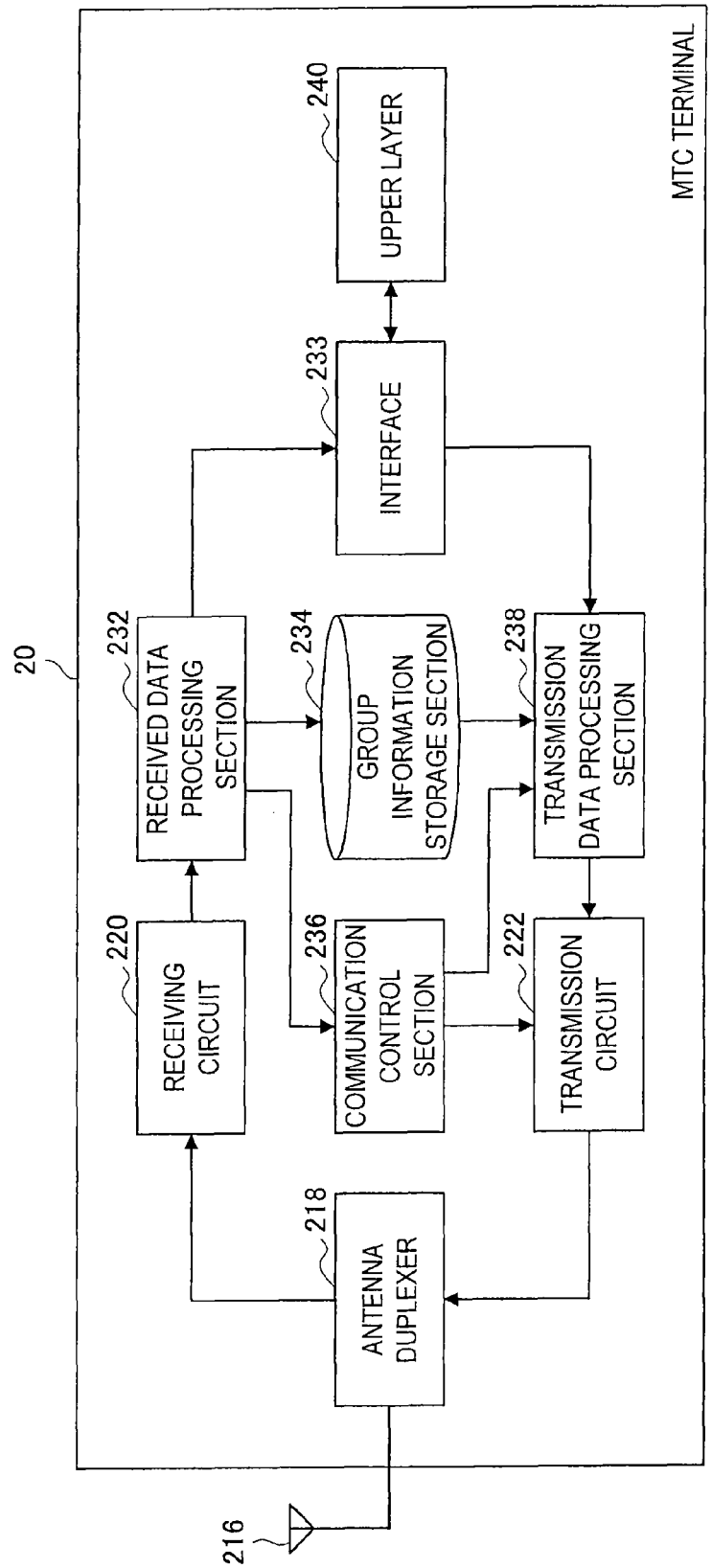
FIG. 8 is an explanatory diagram showing a configuration of an MTC terminal in accordance with the first embodiment.

FIG. 8 is an explanatory diagram showing a configuration of an MTC terminal 20 in accordance with the first embodiment. As shown in FIG. 8, the MTC terminal 20 includes an antenna 216, an antenna duplexer 218, a receiving circuit 220, a transmission circuit 222, a received data processing section 232, an interface 233, a group information storage section 234, a communication control section 236, a transmission data processing section 238, and an upper layer 240.

The antenna 216 receives a wireless signal from the base station 10, and converts the wireless signal into an electrical reception signal. Upon reception, the antenna 216 and the receiving circuit 220 are connected through the antenna duplexer 218, and the reception signal obtained by the antenna 216 is supplied to the receiving circuit 220.

Upon transmission, the antenna 216 and the transmission circuit 222 are connected through the antenna duplexer 218, and a transmission signal is supplied from the transmission circuit 222 to the antenna 216. The antenna 216 transmits the transmission signal to the base station 10 as a wireless signal.

In FIG. 8, only one antenna is shown for convenience of description, but the MTC terminal 20 may have a plurality of antennas. When the MTC terminal 20 has a plurality of antennas, it is possible to perform MIMO communication, diversity communication, or the like.

The receiving circuit 220 performs demodulation processing, decoding processing, and the like of the reception signal supplied from the antenna 216, and supplies the post-process received data to the received data processing section 232. In this way, the receiving circuit 220 functions as a receiving section in cooperation with the antenna 216.

The transmission circuit 222 performs modulation processing and the like of a control signal supplied from the communication control section 236, a data signal supplied from the transmission data processing section 238, and the like, and supplies a post-process transmission signal to the antenna 216. In this way, the transmission circuit 222 functions as a transmission section in cooperation with the antenna 216.

The received data processing section 232 analyzes the received data supplied from the receiving circuit 220, and supplies received data for the upper layer to the interface 233. Meanwhile, group information received when the MTC terminal 20 is determined as a representative MTC terminal is supplied to the group information storage section 234. The group information storage section 234 stores the group information supplied from the received data processing section 232.

The interface 233 is an interface with the upper layer 240. The received data is output from the interface 233 to the upper layer 240, and the transmission data is input from the upper layer 240 to the interface 233.

The upper layer 240 is a function section for executing an application in accordance with the MTC terminal 20. As described above, "Metering," "Health," or the like may be used as the application. When the application is "Metering," transmission data is assumed to be data indicating water or electricity usage. Also, when the application is "Health," transmission data is assumed to be data indicating a current body state of a patient.

The transmission data processing section 238 generates a data signal based on data supplied from the interface 133, and supplies the data signal to the transmission circuit 222. When the MTC terminal 20 operates as a representative MTC terminal, the transmission data processing section 238 generates a data signal indicating the group information stored in the group information storage section 234, and supplies the data signal to the transmission circuit 222.

The communication control section 236 controls overall communication such as transmission processing and reception processing, random access, or the like by the MTC terminal 20. For example, the communication control section 236 generates a random number upon random access, and compares the generated random number with an AC barring factor received from the base station 10. When the generated random number is smaller than the AC barring factor, the communication control section 236 causes the transmission circuit 222 to transmit a preamble. Meanwhile, when the generated random number is larger than the AC barring factor, random access is performed again after a time determined based on an AC barring time received from the base station 10.

[2-4. Operation of Wireless Communication System]

The configurations of the base station 10 and the MTC terminal 20 in accordance with the first embodiment of the present invention have been described above. Next, operation of the wireless communication system 1 in accordance with the first embodiment of the present invention will be described with reference to FIG. 9.

Figure 9:
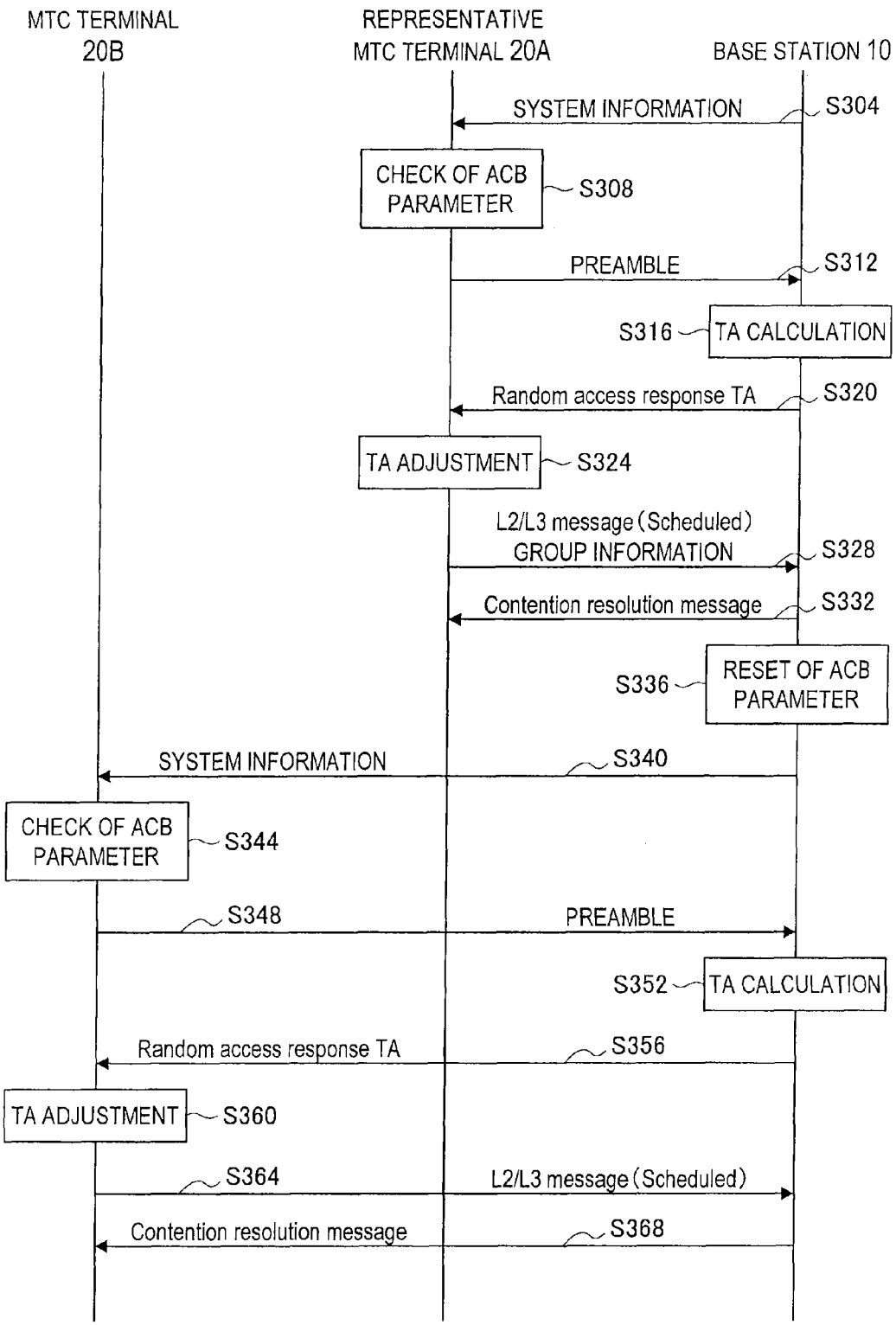
FIG. 9 is a sequence diagram illustrating operation of a wireless communication system in accordance with the first embodiment of the present invention.

FIG. 9 is a sequence diagram illustrating operation of the wireless communication system 1 in accordance with the first embodiment of the present invention. According to a random access procedure of this embodiment illustrated in FIG. 9, a connection is implemented between the base station 10 and each MTC terminal 20. FIG. 9 illustrates a sequence of a case in which the MTC terminal 20A, the MTC terminal 20B, and the like belong to MTC group 2, and the MTC terminal 20A has been determined as a representative MTC terminal.

First, as illustrated in S304 to S332 of FIG. 9, the representative MTC terminal 20A performs random access to the base station 10 prior to other MTC terminals, such as the MTC terminal 20B and the like, in the MTC group. Specifically, when system information is received from the base station 10 (S304), the representative MTC terminal 20A checks an ACB parameter included in the system information (S308). Then, the communication control section 236 of the representative MTC terminal 20A determines whether transmission of a preamble is possible based on the ACB parameter, and causes the transmission circuit 222 to transmit a preamble according to the determination result (S312).

The base station 10 calculates a Timing Advance value from a relationship between a time when the preamble arrives at the base station 10 and a random access window (S316). Then, the base station 10 transmits a random access response to the representative MTC terminal 20A (S320). This random access response includes, for example, uplink transmission permitting data and the Timing Advance value.

When the random access response is received, the representative MTC terminal 20A adjusts a transmission timing based on the Timing Advance value (S324), and then transmits an L2/L3 message (S328). Here, the representative MTC terminal 20A also transmits group information stored in the group information storage section 234 as the L2/L3 message. According to such a configuration, it becomes unnecessary to separately transmit the group information, and thus it is possible to reduce a time for a series of processing.

In response to the group information, the base station 10 transmits a contention resolution message to the representative MTC terminal 20A (S332), so that the representative MTC terminal 20A and the base station 10 are connected.

In addition, the communication control section 136 of the base station 10 resets the ACB parameter based on the group information received from the representative MTC terminal 20A (S336). For example, the communication control section 136 may reset an AC barring factor to a smaller value as the number of terminals indicated by the group information received from the representative MTC terminal 20A increases. Alternatively, the communication control section 136 may reset an AC barring time so that a timing of performing random access determined by the AC barring time is delayed more as the number of terminals indicated by the number of terminals indicated by the group information received from the representative MTC terminal 20A increases.

After that, when system information including the reset ACB parameter is announced by a BCH from the base station 10 (S340), other MTC terminals 20 such as the MTC terminal 20B and the like perform random access to the base station 10 as illustrated in S344 to S368.

Specifically, the MTC terminal 20B checks the post-reset ACB parameter of which a destination is MTC group 2 and of which a reset flag is on (S344). Then, the MTC terminal 20B determines whether transmission of a preamble is possible based on the ACB parameter, and transmits a preamble according to the determination result (S348).

The base station 10 calculates a Timing Advance value from a relationship between a time when the preamble arrives at the base station 10 and a random access window (S352). Then, the base station 10 transmits a random access response to the MTC terminal 20B (S356). This random access response includes, for example, uplink transmission permitting data and the Timing Advance value.

When the random access response is received, the MTC terminal 20B adjusts a transmission timing based on the Timing Advance value (S360), and then transmits an L2/L3 message (S364). In response to the L2/L3 message, the base station 10 transmits a contention resolution message to the MTC terminal 20B (S368), so that the MTC terminal 20B and the base station 10 are connected.

As described above, due to the wireless communication system 1 in accordance with the first embodiment, preamble transmission timings of respective MTC terminals 20 in an MTC group can be distributed according to the number of terminals in the MTC group, and thus it is possible to suppress congestion of random access.

Modified Example

An example of transmitting group information together with an L2/L3 message has been described above, but as in a modified example to be described below with reference to FIG. 10, the representative MTC terminal 20A may transmit group information after connecting with the base station 10.

Figure 10:
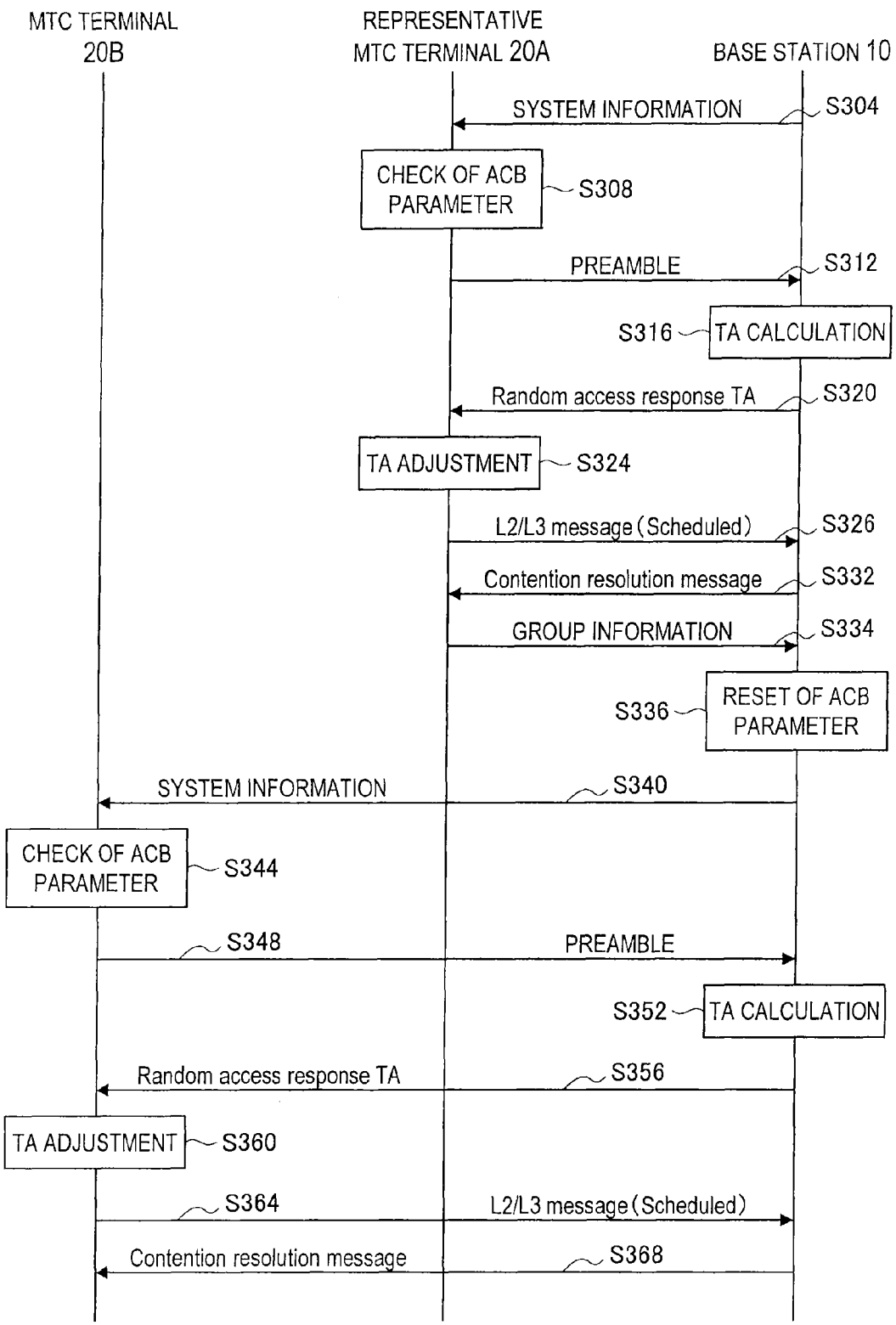
FIG. 10 is a sequence diagram illustrating a modified example of operation of the wireless communication system in accordance with the first embodiment of the present invention.

FIG. 10 is a sequence diagram illustrating a modified example of operation of the wireless communication system 1 in accordance with the first embodiment of the present invention. First, as illustrated in S304 to S332 of FIG. 10, the representative MTC terminal 20A performs random access to the base station 10 prior to other MTC terminals, such as the MTC terminal 20B and the like, in the MTC group. The modified example is different from the example illustrated in FIG. 9 in that the representative MTC terminal 20A does not transmit group information together with an L2/L3 message in S326.

After random access to the base station 10, the representative MTC terminal 20A transmits group information to the base station 10 (S334). Subsequently, the communication control section 136 of the base station 10 resets an ACB parameter based on the group information received from the representative MTC terminal 20A (S336).

After that, when system information including the reset ACB parameter is announced by a BCH from the base station 10 (S340), other MTC terminals 20 such as the MTC terminal 20B and the like perform random access to the base station 10 as in the example illustrated in FIG. 9 (S344 to S368).

3. Second Embodiment

The first embodiment of the present invention has been described above. Next, a second embodiment of the present invention will be described. The second embodiment of the present invention has many portions in common with the first embodiment, but information that is reset based on group information received from a representative MTC terminal 20 by the base station 10 is different from that of the first embodiment. In the description of such a second embodiment of the present invention, resources for an MTC terminal 20 to perform random access will be described first.

(RACH_configuration_index)

The base station 10 designates resources for an MTC terminal 20 to transmit a preamble in random access using a RACH_configuration_index. Then, the base station 10 announces the RACH_configuration_index as system information, and the MTC terminal 20 transmits a preamble in a subframe specified by the RACH_configuration_index.

FIG. 11 is an explanatory diagram showing a relationship between a RACH_configuration_index and a subframe. As shown in FIG. 11, one or two or more subframes may correspond to each number of RACH_configuration_index. For example, subframe#1 corresponds to RACH_configuration_index#0, and subframes#1, 4 and 7 correspond to RACH_configuration_index#9.

When a plurality of subframes correspond to a RACH_configuration_index, the MTC terminal 20 transmits a preamble in a random access window in any one subframe among the plurality of subframes. Thus, the larger the number of subframes corresponding to a RACH_configuration_index, the more temporally preamble transmission from the MTC terminals 20 can be distributed.

Description of Second Embodiment

Figure 12:
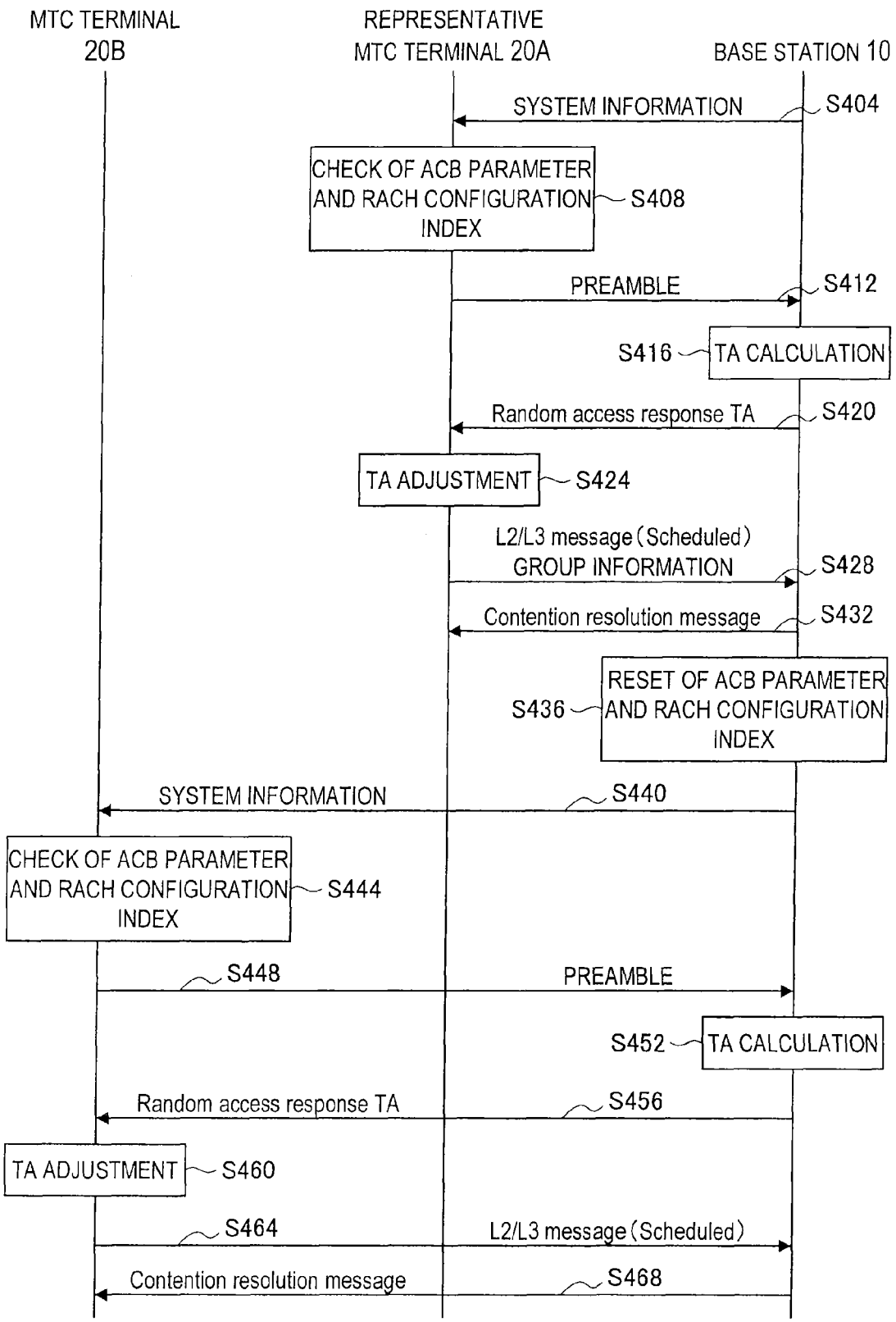
FIG. 12 is a sequence diagram illustrating operation of a wireless communication system 1 in accordance with a second embodiment of the present invention.

Here, the base station 10 in accordance with the second embodiment of the present invention resets a RACH_configuration_index based on group information received from a representative MTC terminal 20. Specifically, the communication control section 236 of the base station 10 in accordance with the second embodiment resets a RACH_configuration_index to a RACH_configuration_index corresponding to a larger number of subframes as the number of terminals indicated by the group information received from the representative MTC terminal 20 increases. With reference to FIG. 12, description will be made in detail below.

FIG. 12 is a sequence diagram illustrating operation of the wireless communication system 1 in accordance with the second embodiment of the present invention. According to a random access procedure of this embodiment illustrated in FIG. 12, a connection is implemented between the base station 10 and each MTC terminal 20. FIG. 12 illustrates a sequence of a case in which the MTC terminal 20A, the MTC terminal 20B, and the like belong to MTC group 2, and the MTC terminal 20A has been determined as a representative MTC terminal.

First, as illustrated in S404 to S432 of FIG. 12, the representative MTC terminal 20A performs random access to the base station 10 prior to other MTC terminals, such as the MTC terminal 20B and the like, in the MTC group. Specifically, when system information is received from the base station 10 (S404), the representative MTC terminal 20A checks an ACB parameter and a RACH_configuration_index included in the system information (S408).

Then, the communication control section 236 of the representative MTC terminal 20A determines whether transmission of a preamble is possible based on the ACB parameter, and causes the transmission circuit 222 to transmit a preamble in a random access window of a subframe specified by the RACH_configuration_index according to the determination result (S412).

The base station 10 calculates a Timing Advance value from a relationship between a time when the preamble arrives at the base station 10 and the random access window (S416). Then, the base station 10 transmits a random access response to the representative MTC terminal 20A (S420). This random access response includes, for example, uplink transmission permitting data and the Timing Advance value.

When the random access response is received, the representative MTC terminal 20A adjusts a transmission timing based on the Timing Advance value (S424), and then transmits an L2/L3 message (S428). Here, the representative MTC terminal 20A also transmits group information stored in the group information storage section 234 as the L2/L3 message. According to such a configuration, it becomes unnecessary to separately transmit the group information, and thus it is possible to reduce a time for a series of processing. However, the representative MTC terminal 20A may transmit the group information separately from the L2/L3 message after random access.

In response to the group information, the base station 10 transmits a contention resolution message to the representative MTC terminal 20A (S432), so that the representative MTC terminal 20A and the base station 10 are connected.

In addition, the communication control section 136 of the base station 10 resets the ACB parameter and the RACH_configuration_index based on the group information received from the representative MTC terminal 20A (S436). For example, the communication control section 136 may reset the RACH_configuration_index to a RACH_configuration_index corresponding to a larger number of subframes as the number of terminals indicated by the group information received from the representative MTC terminal 20 increases.

After that, when system information including the reset ACB parameter and RACH_configuration_index is announced by a BCH from the base station 10 (S440), other MTC terminals 20 such as the MTC terminal 20B and the like perform random access to the base station 10 as illustrated in S444 to S468.

Specifically, the MTC terminal 20B checks the post-reset ACB parameter of which a destination is MTC group 2 and of which a reset flag is on and the post-reset RACH_configuration_index (S444). Then, the MTC terminal 20B determines whether transmission of a preamble is possible based on the ACB parameter, and transmits a preamble in a subframe specified by the RACH_configuration_index according to the determination result (S448).

The base station 10 calculates a Timing Advance value from a relationship between a time when the preamble arrives at the base station 10 and the random access window (S452). Then, the base station 10 transmits a random access response to the MTC terminal 20B (S456). This random access response includes, for example, uplink transmission permitting data and the Timing Advance value.

When the random access response is received, the MTC terminal 20B adjusts a transmission timing based on the Timing Advance value (S460), and then transmits an L2/L3 message (S464). In response to the L2/L3 message, the base station 10 transmits a contention resolution message to the MTC terminal 20B (S468), so that the MTC terminal 20B and the base station 10 are connected.

4. Summarization

As described above, in embodiments of the present invention, a representative MTC terminal 20 transmits group information indicating the number of terminals in an MTC group to the base station 10, and the base station 10 resets control information for controlling random access such as an ACB parameter, a RACH_configuration_index, or the like according to the number of terminals indicated by the group information. Then, other MTC terminals 20 in the MTC group perform random access according to the reset ACB parameter or RACH_configuration_ index, or the like. In such a configuration, preamble transmission timings of respective MTC terminals 20 in the MTC group can be distributed according to the number of terminals in the MTC group, and thus it is possible to suppress congestion of random access.

The preferred embodiments of the present invention have been described above with reference to the accompanying drawings, whilst the present invention is not limited to the above examples, of course. A person skilled in the art may find various alternations and modifications within the scope of the appended claims, and it should be understood that they will naturally come under the technical scope of the present invention.

For example, respective steps in processing of the base station 10 and MTC terminals 20 of this specification do not have to be performed in time series according to a sequence illustrated as a sequence diagram. For example, respective steps in processing of the base station 10 and MTC terminals 20 may be performed in a sequence different from that illustrated as a sequence diagram, or performed in parallel.

In addition, it is also possible to create a computer program for causing hardware such as CPUs, ROMs, RAMs, and the like installed in the base station 10 and MTC terminals 20 to perform the same functions as the respective configurations of the base station 10 and MTC terminals 20 described above. Also, a storage medium in which the computer program is stored is provided.

REFERENCE SIGNS LIST 10 base station
20 MTC terminal
30 MTC server
116, 216 antenna
118, 218 antenna duplexer
120, 220 receiving circuit
122, 222 transmission circuit
132, 232 received data processing section
133, 233 interface
134, 236 communication control section
138, 238 transmission data processing section
140, 240 upper layer

The invention claimed is:

1. A wireless terminal comprising:
   circuitry configured to
      store information corresponding to a plurality of wireless terminals included in a group, the wireless terminal being a representative of the group,
      control random access to a base station by the wireless terminal before any other wireless terminal included in the group performs random access to the base station,
      transmit the information corresponding to the plurality of wireless terminals to the base station,
      receive a timing advance parameter from the base station in response to the random access, and
      adjust an internal advance of the wireless terminal based on the timing advance parameter,
   wherein the information corresponding to the plurality of wireless terminals includes number-of-terminals-information indicating a number of the plurality of wireless terminals included in the group, and
   the circuitry is further configured to receive the information corresponding to the plurality of wireless terminals from a server managing the group in which the plurality of wireless terminals are included.

2. The wireless terminal according to claim 1, wherein control information for controlling random access by the plurality of wireless terminals is set based on the information corresponding to the plurality of wireless terminals transmitted by the circuitry.

3. The wireless terminal according to claim 1, wherein the circuitry transmits the information corresponding to the plurality of wireless terminals included in the group to the base station during the random access.

4. The wireless terminal according to claim 1, wherein the circuitry transmits the information corresponding to the plurality of wireless terminals included in the group to the base station after the random access.

5. The wireless terminal according to claim 1, wherein the group is classified according to an access class set in universal subscriber identity modules (USIMs) of the plurality of wireless terminals.

6. The wireless terminal according to claim 1, wherein the plurality of wireless terminals included in the group are present in a cell area of the base station.

7. A wireless communication method performed in a wireless terminal, comprising:

storing, in circuitry, information corresponding to a plurality of wireless terminals included in a group, one of the plurality of wireless terminals being a representative of the group;

controlling, with the circuitry, random access to a base station by the one of the plurality of wireless terminals before any other wireless terminal included in the group performs random access to the base station;

transmitting, with the circuitry, the information corresponding to the plurality of wireless terminals to the base station;

receiving, in the circuitry, a timing advance parameter from the base station in response to the random access, and adjusting, with the circuitry, an internal timing of the wireless terminal based on the timing advance parameter, wherein the information corresponding to the plurality of wireless terminals includes number-of-terminals-information indicating a number of the plurality of wireless terminals included in the group, and the information corresponding to the plurality of wireless terminals is received by the circuitry from a server managing the group in which the plurality of wireless terminals are included.

8. A wireless communication system comprising:
a base station; and
a wireless terminal that a plurality of wireless terminals included in a group, the wireless terminal including circuitry configured to
store information corresponding to the plurality of wireless terminals included in the group,
control random access to the base station by the wireless terminal before any other wireless terminal included in the group performs random access to the base station,
transmit the information corresponding to the plurality of wireless terminals to the base station,
receive a timing advance parameter from the base station in response to the random access, and
adjust an internal timing of the wireless terminal based on the timing advance parameter,
wherein the information corresponding to the plurality of wireless terminals includes number-of-terminals-information indicating a number of the plurality of wireless terminals included in the group, and
the circuitry is further configured to receive the information corresponding to the plurality of wireless terminals from a server managing the group in which the plurality of wireless terminals are included.

9. The wireless terminal according to claim 1, wherein the timing advance parameter is determined based on a difference between receipt of a preamble at the base station and a predetermined random access window.

10. The wireless terminal according to claim 1, wherein others of the plurality of wireless terminals perform random access to the base station in response to a system information message from the base station.

11. The wireless terminal according to claim 10, wherein the system information from the base station includes an indication that an access control parameter is reset.

12. The wireless terminal according to claim 10, wherein the others of the plurality of wireless terminals receive the timing advance parameter, and adjust respective internal timings based on the timing advance parameter.

13. The wireless terminal according to claim 12, wherein each of the other wireless terminals transmits a preamble to the base station and receive the timing advance parameter in a response thereto.

* * * * *